US009371804B2

(12) United States Patent
Leonard et al.

(10) Patent No.: US 9,371,804 B2
(45) Date of Patent: Jun. 21, 2016

(54) SELF CLEANING DUST BOX ASSEMBLY FOR USE WITH CONTROLLED TUBE ASSEMBLIES, SUCH AS FORMING A PORTION OF A FRESH AIR REPLACEMENT LINE ASSOCIATED WITH A VEHICLE FUEL TANK

(71) Applicant: U.S. Farathane Corporation, Auburn Hills, MI (US)

(72) Inventors: Stephen G. Leonard, Waterford, MI (US); Kevin Charles Baxter, Goodrich, MI (US)

(73) Assignee: U.S. Farathane Corporation, Auburn Hills, MI (US)

(*) Notice: Subject to any disclaimer, the term of this patent is extended or adjusted under 35 U.S.C. 154(b) by 189 days.

(21) Appl. No.: 14/244,827

(22) Filed: Apr. 3, 2014

(65) Prior Publication Data

US 2014/0311442 A1 Oct. 23, 2014

Related U.S. Application Data

(60) Provisional application No. 61/813,469, filed on Apr. 18, 2013.

(51) Int. Cl.

| | |
|---|---|
| ***B01D 50/00*** | (2006.01) |
| ***F02M 35/08*** | (2006.01) |
| ***F02M 25/08*** | (2006.01) |
| ***F02M 35/02*** | (2006.01) |

(52) U.S. Cl.

CPC ............. *F02M 35/08* (2013.01); *F02M 25/089* (2013.01); *F02M 35/0201* (2013.01)

(58) Field of Classification Search

CPC ................. B01D 35/027; B01D 45/08; F02M 35/10229; F02M 35/161; F02M 2013/0461; F02M 25/089; F02M 35/0201; F02M 35/08; F23L 1/00

See application file for complete search history.

(56) References Cited

U.S. PATENT DOCUMENTS

| | | | | |
|---|---|---|---|---|
| 3,683,597 | A | 8/1972 | Beveridge et al. | |
| 3,685,504 | A | 8/1972 | Torazza | |
| 3,859,063 | A * | 1/1975 | Porter | B01D 45/16 55/337 |
| 5,058,693 | A | 10/1991 | Murdock et al. | |
| 5,450,833 | A | 9/1995 | Denz et al. | |
| 5,501,198 | A | 3/1996 | Koyama | |
| 5,638,786 | A * | 6/1997 | Gimby | F02M 25/0872 123/198 E |
| 5,912,368 | A * | 6/1999 | Satarino | B01D 45/08 55/320 |
| 5,934,260 | A | 8/1999 | Gadkaree et al. | |
| 6,599,350 | B1 * | 7/2003 | Rockwell | B01D 45/12 123/519 |
| 7,008,471 | B2 | 3/2006 | Koyama et al. | |
| 7,051,717 | B2 * | 5/2006 | Meiller | F02M 25/0854 123/518 |
| 7,097,697 | B2 | 8/2006 | Nakamura et al. | |
| 7,201,155 | B2 | 4/2007 | Mills | |
| 7,472,694 | B2 | 1/2009 | King | |

(Continued)

*Primary Examiner* — Marguerite McMahon
*Assistant Examiner* — Tea Holbrook
(74) *Attorney, Agent, or Firm* — Dinsmore & Shohl LLP; Douglas J. McEvoy

(57) ABSTRACT

A filter box assembly for integrating into a bi-directional vent and air intake line associated with a vehicle fuel tank. The assembly includes an outer shell having an open inserting end and an opposite closed end. An inner communicable component is engageable within the open inserting end of the outer shell and collectively defines a plurality of continuous and reverse flow passageways extending between a plurality of inlet apertures defined upon a base surface of the inner component and a conduit attachment nipple extending from the inner component.

19 Claims, 8 Drawing Sheets

(56) References Cited

U.S. PATENT DOCUMENTS

| | | | | |
|---|---|---|---|---|
| 7,699,042 | B2 | 4/2010 | Steinman et al. | |
| 7,938,871 | B2 * | 5/2011 | Lloyd | B01D 45/16 55/337 |
| 7,938,958 | B2 | 5/2011 | Core et al. | |
| 7,980,229 | B2 | 7/2011 | Menke | |
| 8,052,768 | B2 * | 11/2011 | Lin | F02M 25/089 55/320 |
| 8,132,559 | B2 * | 3/2012 | Dong | B01D 46/2411 123/519 |
| 8,156,924 | B2 | 4/2012 | Hudak et al. | |
| 8,327,830 | B2 | 12/2012 | Makino et al. | |
| 8,404,028 | B2 * | 3/2013 | Easton | B01D 45/08 55/437 |
| 8,495,994 | B2 * | 7/2013 | Schleiden | B01D 45/06 123/41.86 |
| 2006/0032486 | A1 * | 2/2006 | Prasad | F01M 13/04 123/572 |
| 2006/0037906 | A1 * | 2/2006 | Assion | B01D 27/06 210/323.1 |
| 2006/0102156 | A1 | 5/2006 | Yamauchi et al. | |
| 2006/0186366 | A1 * | 8/2006 | Bauerle | F16K 31/047 251/279 |
| 2008/0223343 | A1 * | 9/2008 | Ammermann | F02M 25/0854 123/520 |
| 2008/0299811 | A1 * | 12/2008 | Battista | H01R 13/6273 439/345 |
| 2009/0025693 | A1 * | 1/2009 | Steinman | B01D 45/16 123/518 |
| 2009/0139495 | A1 | 6/2009 | Crawford | |
| 2010/0293905 | A1 * | 11/2010 | Lin | F02M 25/089 55/325 |
| 2012/0118273 | A1 | 5/2012 | Kim et al. | |

* cited by examiner

SELF CLEANING DUST BOX ASSEMBLY FOR USE WITH CONTROLLED TUBE ASSEMBLIES, SUCH AS FORMING A PORTION OF A FRESH AIR REPLACEMENT LINE ASSOCIATED WITH A VEHICLE FUEL TANK

CROSS-REFERENCE TO RELATED APPLICATIONS

This Application claims the benefit of U.S. Provisional Application 61/813,469 filed on Apr. 18, 2013, the contents of which are incorporated herein in its entirety.

FIELD OF THE INVENTION

The present invention discloses a dust box design incorporated into a fresh air intake and fuel vapor purge line. More specifically, the dust filter box mounts to an end of the air intake/vapor purge line connected to a vehicle fuel tank via an intermediate carbon canister or other scrubbing element. The dust box is arranged at an isolated and well ventilated location of the engine compartment and includes a serpentine (multiple reverse) passageway for both drawing in fresh air and venting gas vapors, this without the need of any additional filter media, and is particularly suited for preventing intrusion of water as well as any particulates (including flying insects and the like) from clogging the intake line or carbon canister. Additional features include the provision of a top surface located check valve which elevates (typically against a compression spring bias) in response to a buildup of internal pressurization (such as occurring during refilling of the fuel tank). Upon equalization of pressure, the spring bias recloses the check valve.

BACKGROUND OF THE INVENTION

The use of air filtration and venting technology, such as incorporated into vehicle fuel systems and the like, is known in the prior art. Examples of these include the fuel vapor recovery system for a vehicle disclosed in U.S. Pat. No. 5,058,693 to Murdock et al., and in which a charcoal canister is connected to the fuel tank for collecting fuel vapors from the tank, such as during refilling. Upon starting the vehicle, the canister is purged if accumulated vapors and receives atmospheric air to fill the purged volume. A filter is remotely connected by a hose to the air inlet of the canister for removing dirt, dust and water from the incoming air.

Lin et al., U.S. Pat. No. 8,052,768, teaches an air filter assembly for removing dust from an intake airflow associated with an internal combustion engine fuel system. A housing includes an air inlet formed in an upper portion and an air outlet. A plurality of vertically extending baffles are disposed in the housing between the upper and lower portions and form vertically extending channels, a first of which receiving the air entering the housing from the air inlet. The air passes laterally outwards in the housing successively to the other vertical channels in a serpentine flow successively upwards and downwardly through horizontally interconnecting channels prior to existing the housing through the air outlet. The bottom of the housing extends across a bottom of each of the plurality of channels for retaining dust within the housing and a filter is disposed in one of the plurality of vertically extending channels in a path of the serpentine airflow.

Nakamura et al., U.S. Pat. No. 7,097,697, teaches a fuel vapor treatment device for a vehicle including a casing having a charge port connected to the fuel tank, a purge port connected to an intake side of an engine, and an atmospheric air port through which atmospheric air is introduced. A fuel vapor adsorbing material is filled in the casing, along with a filter disposed between the atmospheric air port and the adsorbing material to trap dust contained in the atmospheric air. A baffle plate is disposed in the casing and between the atmospheric air port and the filter so that atmospheric air strikes against the baffle plate to change its flow into a generally radial direction to flow through the annular space to the filter.

Finally, Steinman et al., U.S. Pat. No. 7,699,042, teaches a filtration device for use with a fuel recover system having a housing defining a chamber with an upper end and a lower end. A cap is configured to be positioned on and close to the upper end of the housing, the cap defining a helical extending passageway toward the lower end of the chamber and including an air inlet such that air entering the chamber is directed to rotate in the chamber about the rotational axis wherein a centrifugal force of the rotating air filters out contaminants contained therein and a downward force of the air urges the contaminants toward the lower end and through an air outlet for removing the filtered air from the device.

SUMMARY OF THE INVENTION

The present invention discloses a filter box assembly for integrating into a bi-directional vent and air intake line associated with a vehicle fuel tank. The assembly includes an outer shell having an open inserting end and an opposite closed end. An inner communicable component is engageable within the open inserting end of the outer shell and collectively defines a plurality of continuous and reverse flow passageways extending between a plurality of inlet apertures defined upon a base surface of the inner component and a conduit attachment nipple extending from the inner component.

The outer shell further includes an interior defined by a sleeve shape element extending from an inner end wall an interior depth defining distance associated with the shell and terminating short of the open end. A pair of window apertures are defined in opposite side locations of the outer shell proximate the open end. The inner attachable and fluidic intercommunicating component further exhibits a generally and outer coaxial and insertable cylindrical shaped profile, an inner sleeve projection extending in an interior coaxially spaced manner relative to the outer cylinder profile. The inner projection terminates in a conical shaped end cap, a plurality of inner perimeter surfaces defined in end-located and fluid communicating apertures.

The base surface of the inner insertable component can further exhibit a rectangular shape to which the outer cylindrical profile and the inner projection are supported. A plurality of reinforcing flanges converge from corner locations of the end wall along circumferentially spaced exterior locations of the outer cylindrical profile.

Additional features include a pair of opposite edge projecting tabs extending from opposite side locations of the base surface, these seating within the window apertures upon interassembly of the insertable component within the outer shell. The inlet apertures can each further include a plurality of vents configured into corner locations of a rectangular shape associated with the base surface.

Other features include a cylindrical shaped nipple extending from a reverse side of the base surface. A plurality of annular serrations or ridges are defined around the nipple for permitting resistive and secure attachment of the vent or air intake line.

Additional features include the provision of a top surface located check valve which elevates (typically against a compression spring bias) in response to a buildup of internal pressurization (such as occurring during refilling of the fuel tank). Upon equalization of pressure, the spring bias recloses the check valve.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

The present invention discloses a dust box design incorporated into a fresh air intake and fuel vapor purge line. More specifically, the dust filter box provides a self-cleaning assembly which mounts to an end of an air intake/vapor purge line connected to a vehicle fuel tank, such as via an intermediate carbon canister or other scrubbing element.

As will be further described in detail, the dust box is arranged at an isolated and well ventilated location of the engine compartment and includes a serpentine (multiple reverse) passageway for both drawing in fresh air and venting gas vapors, this without the need of any additional filter media. In this manner, the dust filter box is particularly suited for preventing intrusion of water as well as any particulates (including flying insects and the like) from clogging the intake line or carbon canister.

Referring collectively to each of FIGS. 1-8, a series of perspective, plan and cutaway views are shown of the two-piece assembleable dust box, generally at 10, according to a first variant of the present inventions and which includes an outer three dimensional shaped body or shell 12 defining an open interior for receiving, such as in snap-fitting fashion, an attachable and fluidic inter-communicating component (referred to via an outer cylindrical shaped profile at 14). The outer and inner components are further depicted as constructed of a lightweight and resilient plastic, it being understood that other materials are capable of being utilized within the scope of the invention.

Figure 1:
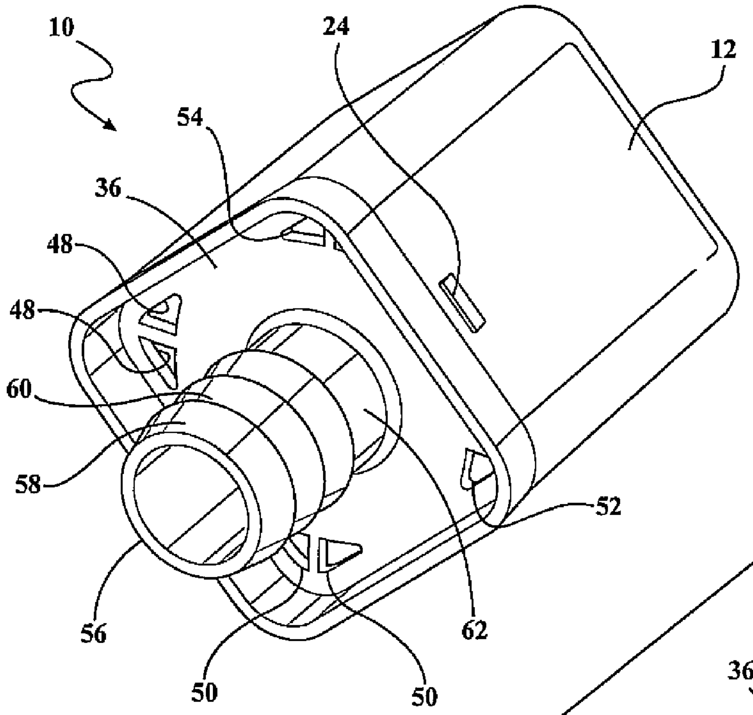
FIG. 1 is an assembled perspective of the dust box according to an embodiment of the present invention.
Figure 2:
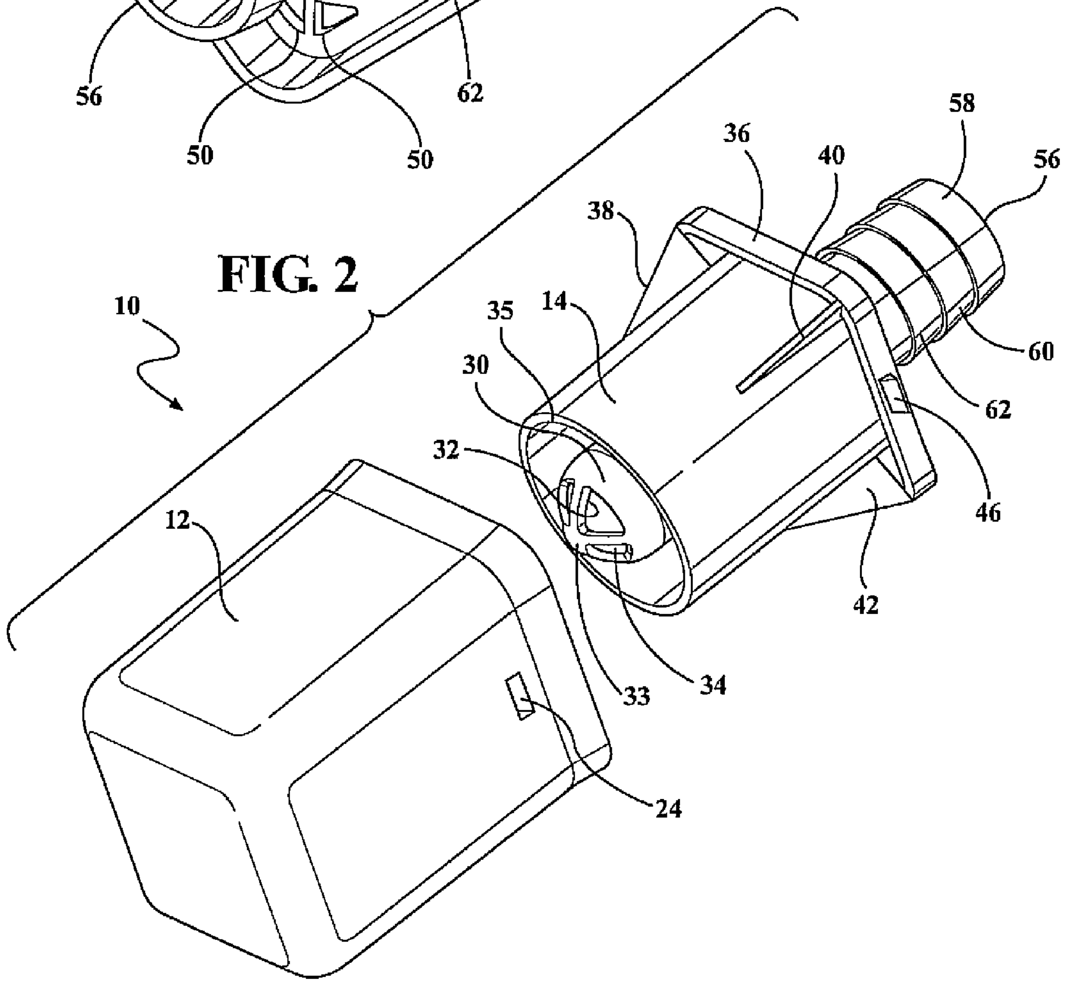
FIG. 2 is an exploded perspective illustrating the outer housing separated from an inner attachable and fluidic intercommunicating component.

The outer body or shell 12 depicted exhibits a generally multi-sided rectangular configuration however is not limited to any particular shape which can also include those exhibiting any other polygonal shape ranging from a three sided triangular shape, to oval or ellipsoidal cross sectional profiles, up to a three dimensional object exhibiting an infinite number of sides corresponding to a circle. As further advantageously shown in the exploded lineal cutaway of FIG. 6, the outer shell 12 exhibits an open end depicted by slightly flared edges 16/18 and reveals and interior defined by a cylindrical or sleeve shape element 20 which is integrally formed with and extends from an inner end wall 22 an interior depth defining distance associated with the body 12 and terminating short of the open end defined by end walls 17 and 19 (FIG. 6) of the flared edges 16/18. A pair of window apertures are shown at 24 and 26, these exhibiting rectangular inner profiles, and are defined on opposite side locations of the outer shell 12 and, as best shown in FIGS. 1-2, are proximate to the bottom open end.

Figure 3:
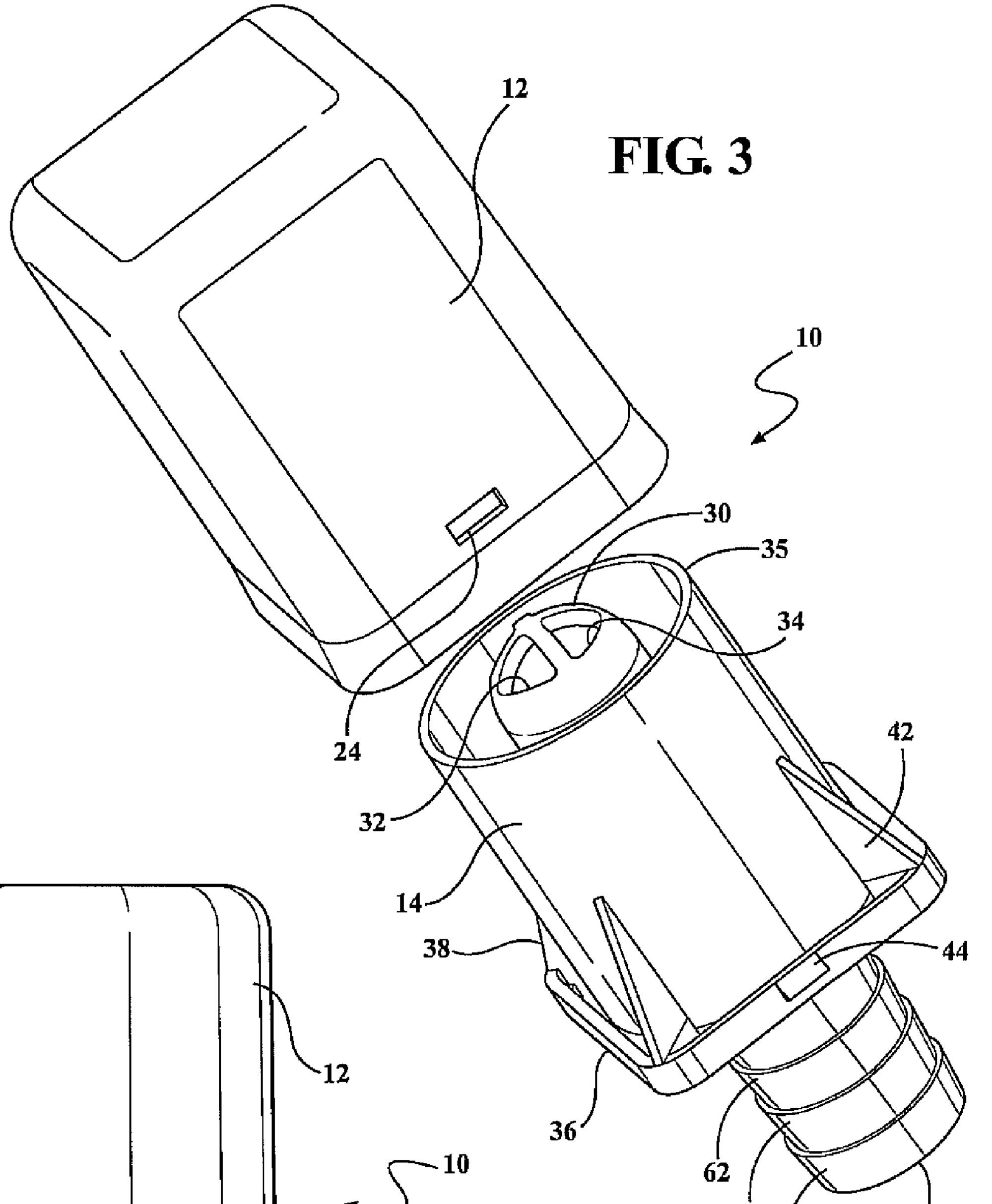
FIG. 3 is a rotated and enlarged perspective similar to that shown in FIG. 2.
Figure 4:
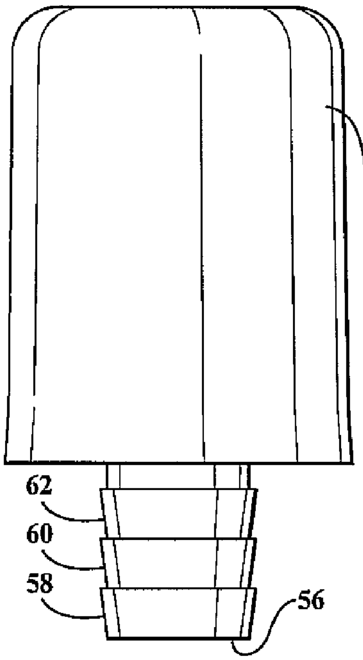
FIG. 4 is an assembled plan view of the dust box shown in FIG. 1.
Figure 5:
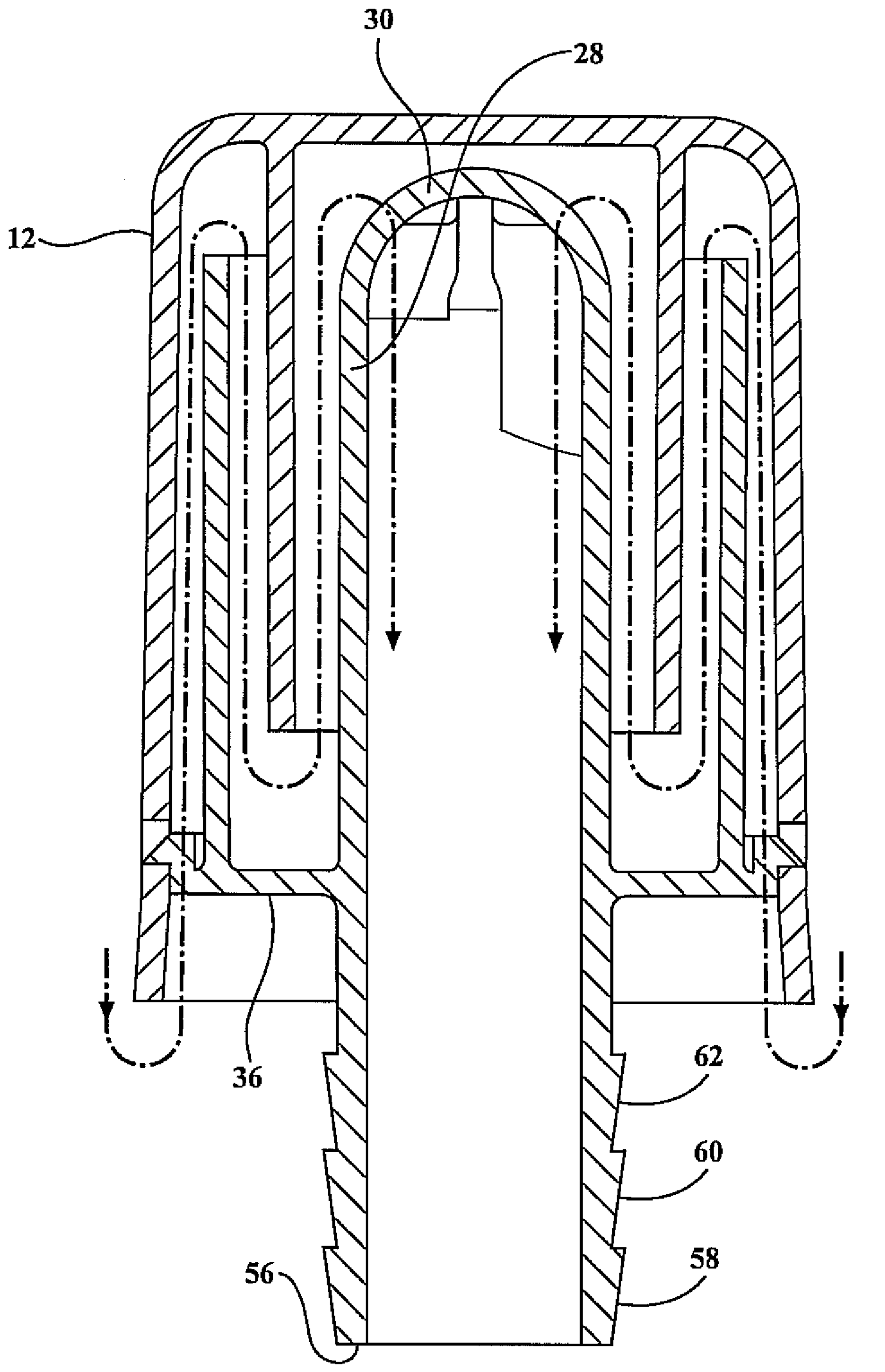
FIG. 5 is a linear cutaway of the dust box in assembled condition and which depicts the configuration of the inner serpentine flow passageways established between a conduit attachment location and a plurality of end face located venting/intake locations.
Figure 6:
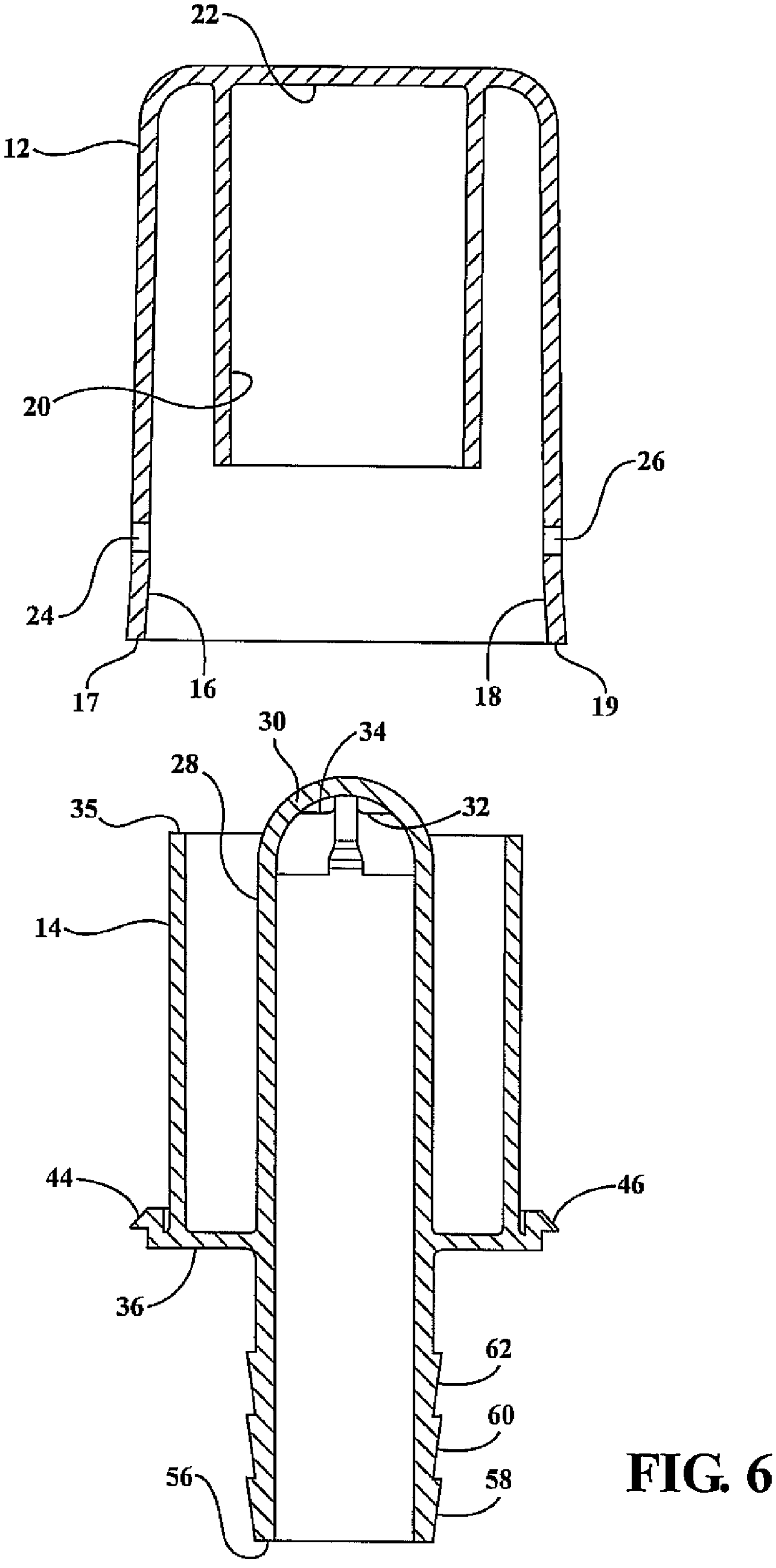
FIG. 6 is an exploded view in linear cutaway of the dust box similar to as depicted in FIG. 3.

As best shown in reference collectively to FIGS. 3 and 5, the inner attachable and fluidic intercommunicating component again exhibits a generally an outer coaxial and insertable cylindrical shaped profile (reference again being made to the depiction previously identified at 14). An inner sleeve projection 28 extends in an interior coaxially spaced manner relative to the outer cylinder profile 14 (this best depicted in the exploded cutaway of FIG. 6), the inner projection terminating in a conical shaped end cap 30. As best again shown in reference to FIG. 3, a plurality of inner perimeter surfaces 32, 34, et seq. define individual branching legs converging at a tip 33 of the cap 30 in order to establish end-located and fluid communicating apertures in the exposed end portion of the conical cap 30, such as at a location which projects above an end wall 35 established upon the cylindrical profile.

Additional features associated with the inner component include a rectangular shaped end support 36 to which the outer cylindrical profile 14 and inner projection 28 are supported. A plurality of reinforcing flanges are further shown at 38, 40, 42, et seq. (see FIG. 2 with a fourth flange hidden from view), these converging from corner locations of the rectangular extending end wall 36 along circumferentially spaced exterior locations of the outer cylindrical profile 14.

A pair of opposite edge projecting tabs 44 and 46 are provided and which extend from opposite (and parallel spaced) side surface locations of the rectangular end support 36, the tabs 44 and 46 being configured in order to seat within the aligning window apertures 24 and 26 upon inter-assembly of the rectangular base wall 36 within the outer shell 12 a sufficient distance for the tabs 44/46 to align with the apertures 24/26 and snap in place. As also best seen in underside perspective of FIG. 1 (with additional cutaway perspectives of FIGS. 7-8), a plurality of (such as four) corner vents or inlets are configured into edge or corner locations of the rectangular end support 36 and which can include any shape not limited to the individual or paired triangular shaped profiles depicted at 48, 50, 52 and 54 and which are formed in the corner locations of the end support 36. A cylindrical shaped nipple 56 extends from a reverse (outer facing) surface of the end support 36 and includes any annular arrangement of serrations or ridges, as shown at 58, 60 and 62, the collective effect of which is to permit resistive and secure attachment of a vent tube or the like, such as associated with the fresh air inlet connector hose schematically shown in FIG. 9.

Figure 8:
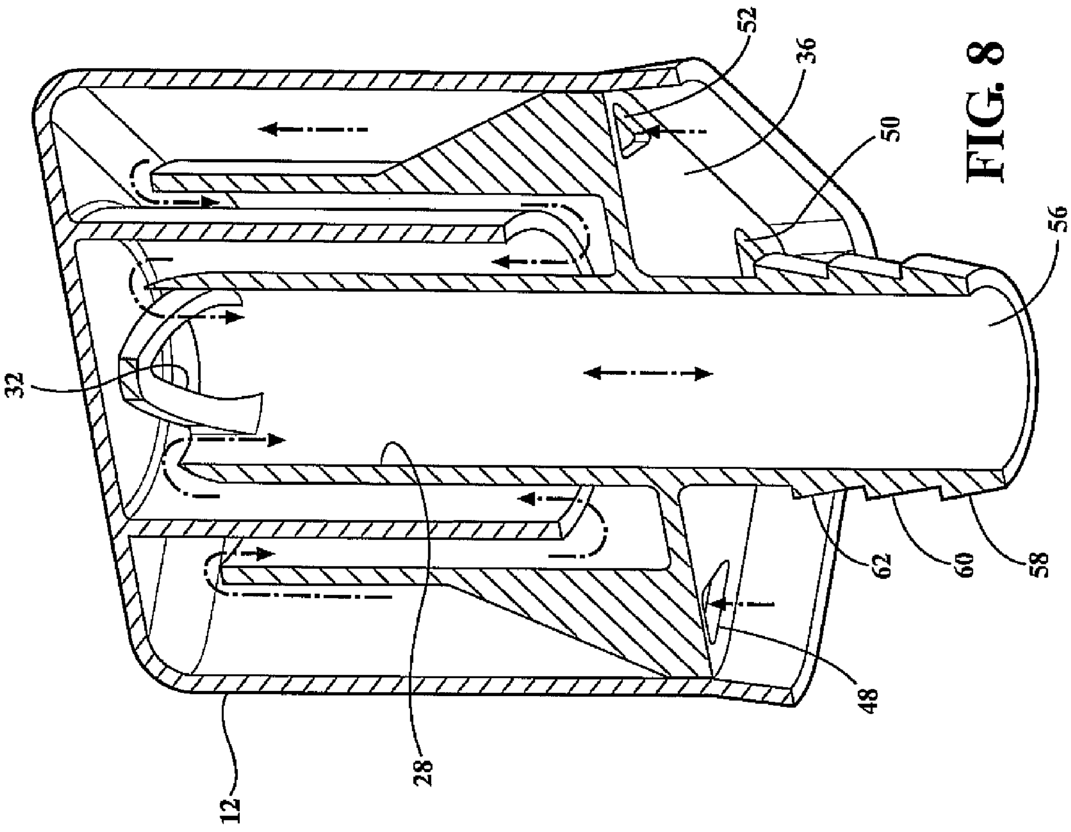
FIG. 8 is a linear cutaway perspective of the dust box shown in FIG. 5.
Figure 7:
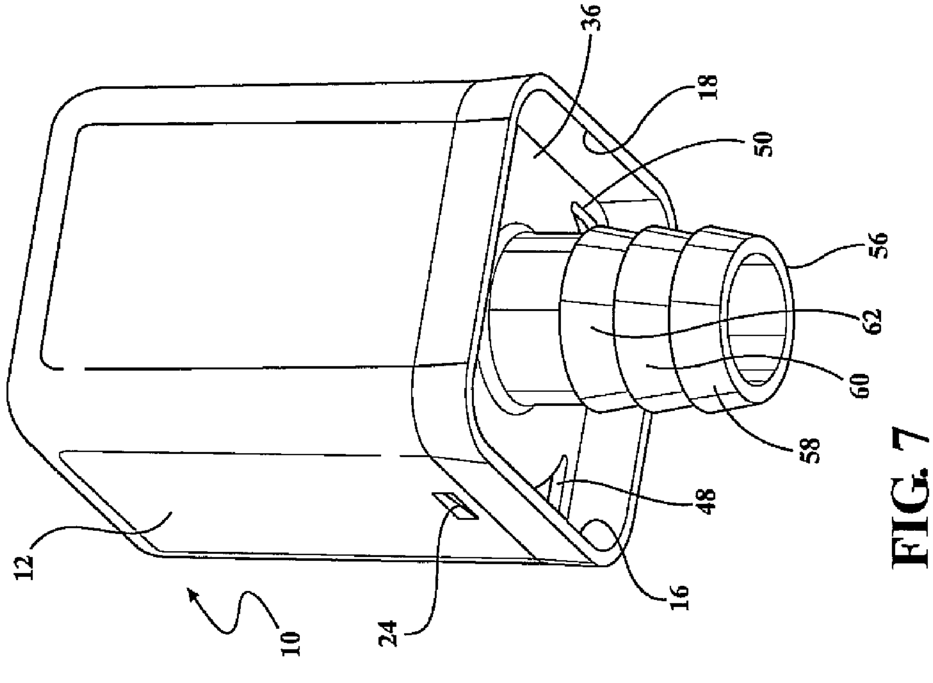
FIG. 7 is a further perspective assembled view similar to as shown in FIG. 1 and illustrating a number of associated features of the dust box.

Upon assembly of the outer shell 12 and inner member 14, and as best shown in the linear cutaway views of FIGS. 5 and 8, depicted is an inner serpentine flow series of interconnected passageways established between the conduit attachment location (nipple 56) and the plurality of end face located venting/intake locations 48, 50, 52 and 54. In this manner, dust box assembly provides each of fresh air intake and gas venting exhaust, as well as prohibiting ingress of contaminants not limited to dust but including also flying and non-flying insects, spiders and the like. Additional to its compact size, the dust filter box additionally provides the advantages of compact size, ease of mounting and no requirement for installation of any type of filter media.

Figure 9:
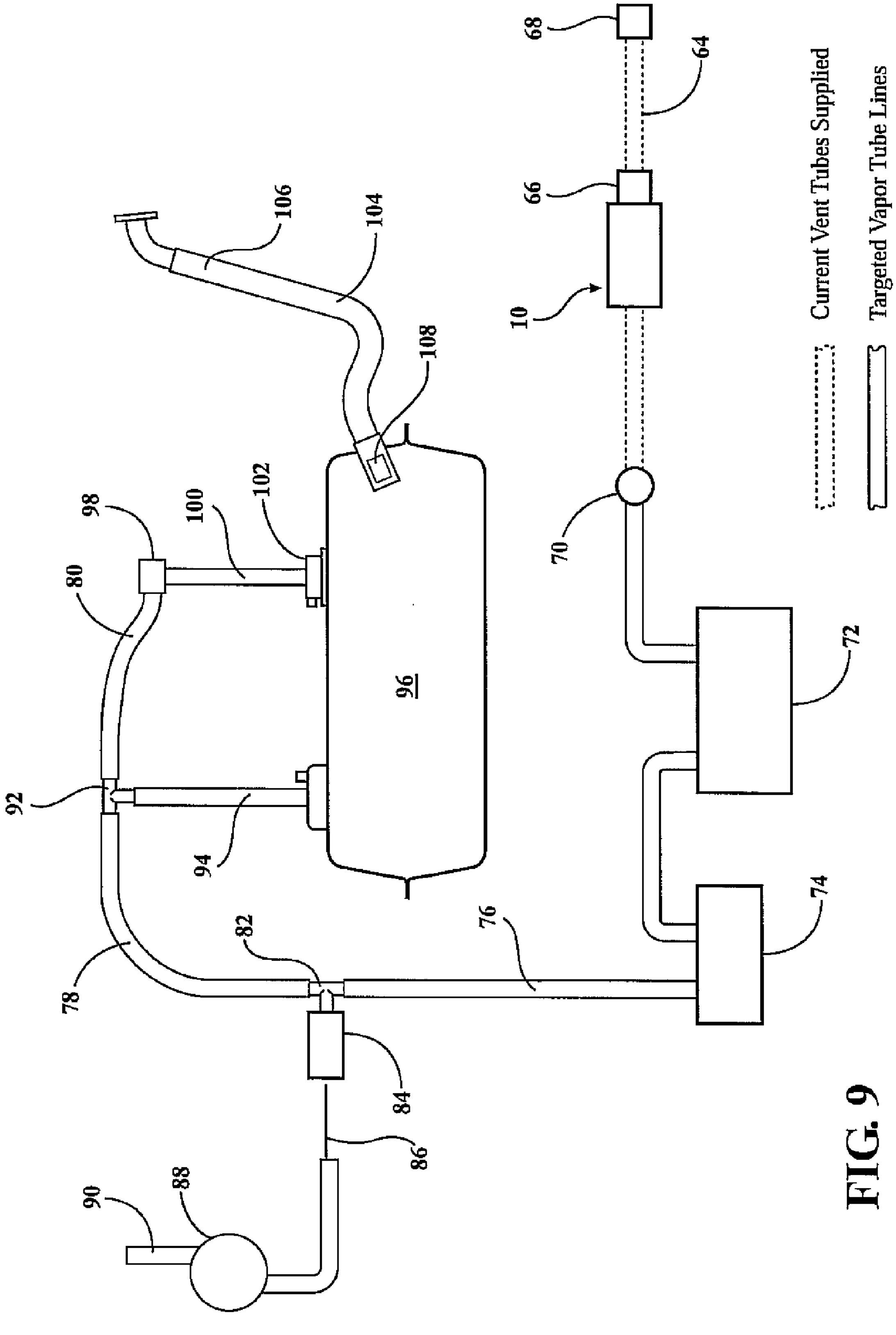
FIG. 9 is a schematic of a fuel system overview incorporating the dust filter box.

Referring to FIG. 9, a schematic view is shown of a fuel system which incorporates the dust filter box 10 associated with the present invention. As depicted, the dust filter 10 is connected to a fresh air inlet 64 via a connector hose 66. A spider screen or other mesh covered outlet is depicted at 68 and is typically arrayed at a remote ventilated location.

The hose 68 extends to a carbon canister vent valve 70, in turn feeding an outlet of an upper evaporative canister 72, this in turn connected to a lower evaporative canister 74. A series of convoluted tubes 76, 78 and 80 are provided in series. A tee 82 is disposed between selected pair of tubing lengths 76 and 78 and engages a connector hose 84. This in turn communicates with a connector hose 86 leading to an outlet of a vapor management valve 88, an inlet of which being supplied by an intake manifold 90.

A second tee 92 interconnects tubes 78 and 80 and in also feeds another tube 94 communicating with a fuel tank 96. Tube 80 terminates in a fuel tank pressure sensor 98 located at a junction with another connector hose 100 terminating at a fill limit vent valve 102 communicating with the fuel tank 96 at a further location. The fuel tank 96 is also accessed at a further location by a fill hose 104 terminating at a gas cap accessible fill neck 106. A fuel tank check valve 108 accesses fill hose 104 to the tank 96 in order to refill gasoline thereto.

In operation, the above-described network maintains proper (positive) pressure to permit continuous and orderly fuel withdrawal according to the normal functioning of the assembly. The dust filter box 10 is further typically arranged at a remote location for facilitating bi-directional flow of both vented gases from the tank (particularly when empty) as well as intake of fresh air, this assisting in maintaining the desired internal pressure conditions.

Figure 10:
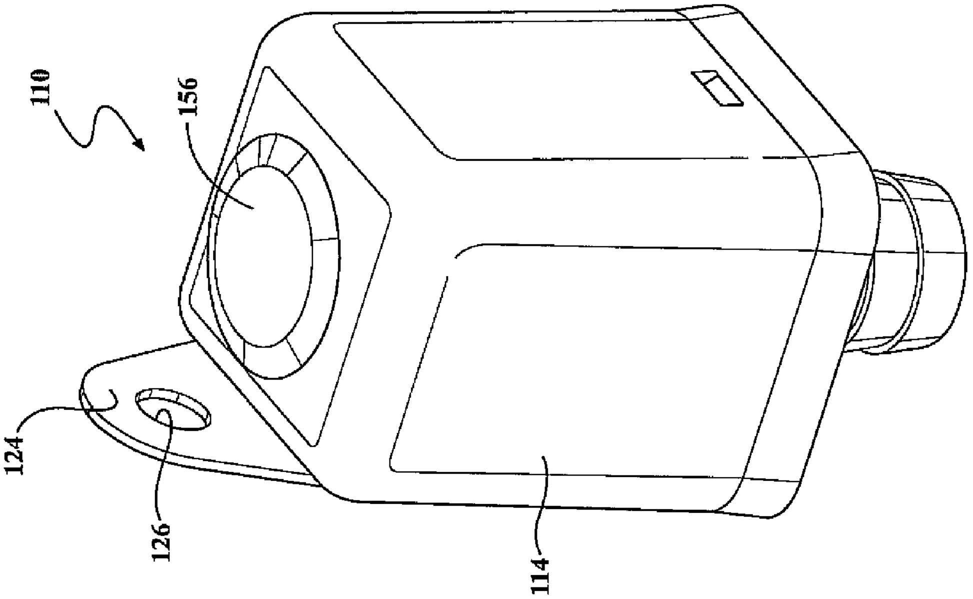
FIG. 10 is a perspective of a dust box according to a further variant.

Referring now to FIG. 10, a perspective is shown generally at 110 of a dust box according to a further variant. As further shown in the accompanying cutaway views of FIGS. 11-12, the dust box is similar in many respects to the initial variant 10 as best depicted in FIG. 8, the dust box 110 including a redesigned outer shell 114 exhibiting a generally rectangular shaped body with an open inserting end (see end wall 116 in FIGS. 11-12). Mating pairs of window and tabs are established between the outer shell 114 and an attachable and fluidic inter-communicating component 118 (see as best shown by selected tab 120 and associated engagement window 122 in FIG. 11). A top bracket 124 (or flange) is formed with the outer shell 114 and can include a mounting aperture (see perimeter extending inner profile 126) for securing the dust box such as to a mounting surface.

As with the first embodiment, the outer shell 114 exhibits an open end depicted by slightly flared edges which reveals and interior defined by a cylindrical or sleeve shape element 128 which is integrally formed with and extends from an inner end wall 130 an interior depth defining distance associated with the body and terminating short of the open end defined by end walls 116. A cylindrical shaped nipple 132 extends from a reverse (outer facing) surface of an end support 134 of the inner attachable component and again includes any annular arrangement of serrations or ridges, as shown at 136, 138 and 140, the collective effect of which is to permit resistive and secure attachment of a vent tube or the like, such as associated with the fresh air inlet connector hose as again schematically shown in FIG. 9.

Figure 11:
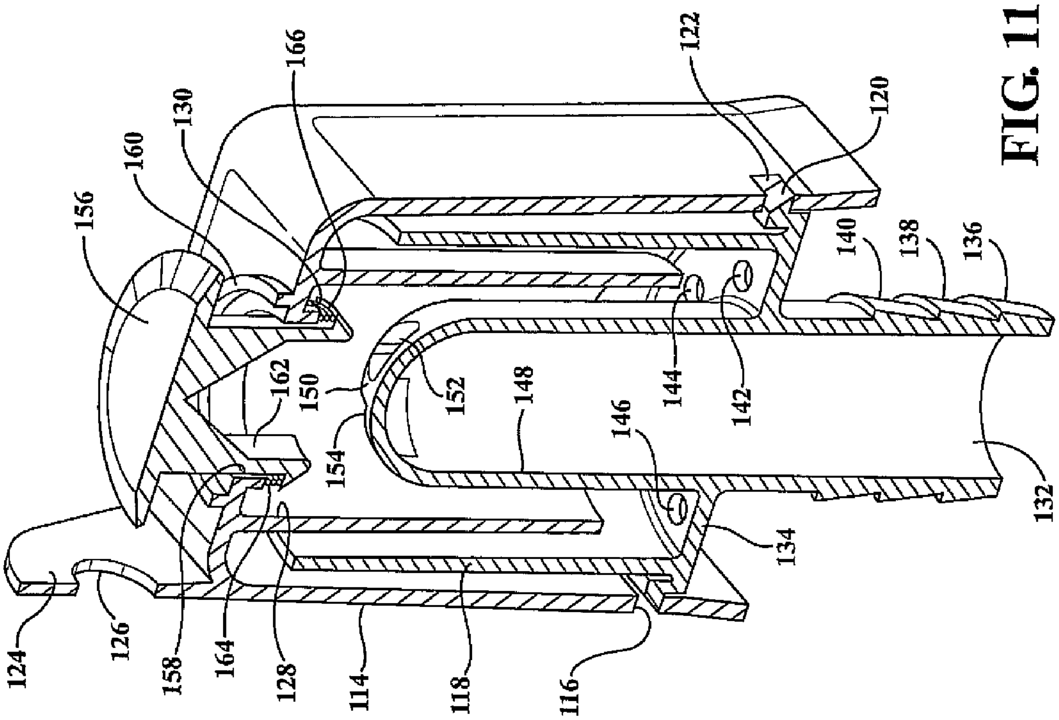
FIG. 11 is a linear cutaway of the dust box of FIG. 10 and depicting a top located relief valve in an open position, such as resulting from pressure buildup within the vessel and allowing for free flow of air out of the associated system.
Figure 12:
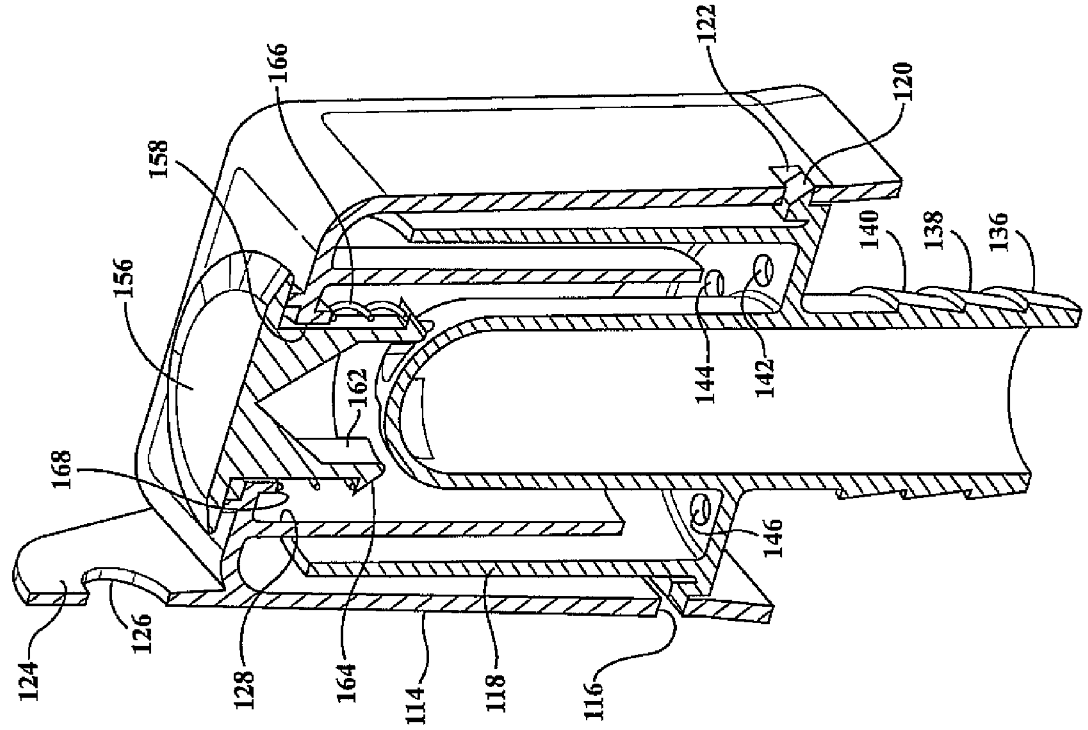
FIG. 12 is a succeeding illustration to FIG. 11 and depicting the relief valve in a closed position following equalization of pressure.

Also depicted in each of FIGS. 11 and 12 are a plurality of individual holes or apertures, these similar in fashion to the triangular shaped profiles previously depicted at 48, 50, 52 and 54 in FIG. 1, a pair of which are shown at 142 in phantom defined in the base or end support 134 in each of FIGS. 11-12. Without limitation, the design can include any number or pattern of holes, not limited to the triangular shaped aperture pairs depicted. It is also envisioned that the apertures can be relocated from the end support 134 to other locations which permit adequate air admittance and in-flow through the assembly.

Similar to the first embodiment 10, an inner sleeve projection 148 extends in an interior coaxially spaced manner relative to the outer cylinder profile 128 (this depicted in the cutaways of FIGS. 11-12), the inner projection terminating in a conical shaped end cap 150. As with the first embodiment, a plurality of inner perimeter surfaces 152, 154, et seq. define individual branching legs converging at a tip of the cap 150 in order to establish end-located and fluid communicating apertures in the exposed end portion of the conical cap.

As shown in FIG. 8, air drawn through the apertures can be redirected in reverse bent and serpentine fashion prior to being redirected through the conical cap and exhausted through the inner sleeve projection 148 of the nipple. Without limitation, the configuration of FIG. 8 can be employed in FIGS. 11-12, it also being envisioned that other serpentine or convoluted airflow patterns can be incorporated within the scope of the invention.

Also show at 156 is a covering cap in the shape of a flared disk shaped portion and forming a portion of a check valve integrated into the top 130 of the outer shell 114. As better shown by the cutaways of FIGS. 11-12, an annular support surface 158 is formed in a generally central interior of the top 130 and, in combination with an upwardly projecting annular seat 160 as best shown in FIG. 11, provides a support for receiving a cylindrical stem 162 projecting from the underside of the flared top disk shaped covering cap 156.

A bottom of the stem 162 includes an outer angled end detent 164. A compression spring 166 (see as best shown in FIG. 12) is seated between an upper seating edge of the end detent 164 and an annular underside profile 168 associated with the top 130 of the shell 114, and which further defines a guiding surface for the check valve stem 162 between elevated/open (FIG. 11) and retracted/closed (FIG. 12) positions.

As depicted in FIG. 11, the top located relief valve 156 is illustrated in the open position, such as resulting from pressure buildup which can correspond with refilling of the fuel tank. FIG. 12 is a succeeding illustration to FIG. 11 and depicting the relief valve in a closed position following equalization of pressure, at which point the compression spring 166 exerts downwardly on the detent 164 and is able to close the flared edged and disk shaped covering cap 156 in sealing fashion against top seat 160. It is also envisioned that the spring 166 can be removed in instances where the assembly is mounted upright, with the covering cap 156 optionally weighted to provide for gravity closing of the check valve upon sufficient pressure relief. Without limitation, other mechanisms can be employed for biasing the check valve in the closed or seating position relative to the shell and which is opened in response to an increased internal pressure beyond a designed threshold.

The variant of FIGS. 10-12 otherwise operates in a similar fashion as described in FIGS. 1-9 and in which outside air is pulled in through the holes or other suitable pattern formed in the underside located base surface, the air replacing the continually reducing volume in the fuel tank during operation of the vehicle. The intake rate of flow is further typically much lower than the exhaust flow, thereby causing the check valve to engage at given instances when the pressure disparities are sufficiently great that normal performance of the assembly may otherwise be impeded.

Having described our invention, other and additional preferred embodiments will become apparent to those skilled in the art to which it pertains, and without deviating from the scope of the appended claims.

We claim:

1. A filter box assembly for integrating into a bi-directional vent and air intake line associated with a vehicle fuel tank, said assembly comprising:

an outer shell having an open inserting end and opposite closed end said outer shell further including an interior defined by a sleeve shape element extending from an inner end wall an interior depth defining distance associated with said shell and terminating short of the open end;

a pair of window apertures defined in opposite side locations of said outer shell proximate said open end;

an inner component engageable within said open inserting end of said outer shell and collectively defining a plurality of continuous and reverse flow passageways extending between a plurality of inlet apertures formed in a base surface of said inner component and a conduit attachment nipple extending from said inner component; and said inner attachable and fluidic intercommunicating component further including a generally and outer coaxial and insertable cylindrical shaped profile, an inner sleeve projection extending in an interior coaxially spaced manner relative to said outer cylinder profile, said inner projection terminating in a conical shaped end cap, a plurality of inner perimeter surfaces defined in end-located and fluid communicating apertures.

2. The filter box assembly as described in claim 1, said base surface of said inner insertable component further comprising a rectangular shape to which said outer cylindrical profile and said inner projection are supported.

3. The filter box assembly as described in claim 2, further comprising a plurality of reinforcing flanges converging from corner locations of said end wall along circumferentially spaced exterior locations of said outer cylindrical profile.

4. The filter box assembly as described in claim 1, further comprising a pair of opposite edge projecting tabs extending from opposite side locations of said base surface, these seating within said window apertures upon inter-assembly of the insertable component within said outer shell.

5. The filter box assembly as described in claim 1, said inlet apertures each further comprising a plurality of vents configured into corner locations of a rectangular shape associated with said base surface.

6. The filter box assembly as described in claim 1, said conduit attachment nipple further comprising a cylindrical shape extending from a reverse side of said base surface.

7. The filter box assembly as described in claim 6, further comprising a plurality of annular serrations or ridges defined around said nipple for permitting resistive and secure attachment of the vent or air intake line.

8. The filter box assembly as described in claim 1, further comprising a check valve integrated into said closed end of said outer shell.

9. The filter box assembly as described in claim 8, said check valve further comprising a covering cap, a cylindrical stem projecting from an underside of said cap which is channeled between an annular support surface formed into said closed end of said shell.

10. The filter box assembly as described in claim 9, further comprising a bottom of said stem exhibiting an outer angled end detent, a compression spring seated between an upper seating edge of said end detent and an annular underside profile associated with said closed end of said outer shell.

11. A filter box assembly for integrating into a bi-directional vent and air intake line associated with a vehicle fuel tank, said assembly comprising:

a three dimensional shaped outer shell having an open inserting end and opposite closed end;

an inner component engageable within said open inserting end of said outer shell, said inner component having an outer coaxial and insertable extending profile, an inner sleeve projection extending in an interiorly spaced manner relative to said outer profile, said inner projection terminating in a conical shaped end cap, a plurality of inner perimeter surfaces defined in end-located and fluid communicating apertures; and said outer shell and inner component collectively defining a plurality of continuous and reverse flow passageways extending between a plurality of inlet apertures formed in a base surface of said inner component and a conduit attachment nipple extending from said inner component.

12. The filter box assembly as described in claim 11, further comprising a cylindrical shaped nipple extending from a reverse side of said base surface.

13. The filter box assembly as described in claim 12, further comprising a plurality of annular serrations or ridges defined around said nipple for permitting resistive and secure attachment of the vent or air intake line.

14. The filter box assembly as described in claim 11, further comprising a check valve integrated into said closed end of said outer shell.

15. The filter box assembly as described in claim 14, said check valve further comprising a covering cap, a cylindrical stem projecting from an underside of said cap which is channeled between an annular support surface formed into said closed end of said shell.

16. The filter box assembly as described in claim 15, further comprising a bottom of said stem exhibiting an outer angled end detent, a compression spring seated between an upper seating edge of said end detent and an annular underside profile associated with said closed end of said outer shell.

17. A filter box assembly for integrating into a bi-directional vent and air intake line associated with a vehicle fuel tank, said assembly comprising:

an outer shell having an open inserting end and opposite closed end;

an inner component engageable within said open inserting end of said outer shell, said inner component having an outer coaxial and insertable extending profile, an inner sleeve projection extending in an interiorly spaced manner relative to said outer profile, said inner projection terminating in a conical shaped end cap, a plurality of inner perimeter surfaces defined in end-located and fluid communicating apertures;

said outer shell and inner communicable component collectively defining a plurality of continuous and reverse flow passageways extending between a plurality of inlet apertures formed in a base surface of said inner component and a conduit attachment nipple extending from said inner component, a cylindrical shaped nipple extending from a reverse side of said base surface; and a check valve integrated into said closed end of said outer shell, said check valve having a flared disk shape covering portion, a cylindrical stem projecting from an underside of said disk which is channeled between an annular support surface formed into said closed end of said shell, a bottom of said stem exhibiting an outer angled end detent, said covering portion being normally biased in a closed position and being elevated to an open position above an upper seating edge of said shell in response to an internally pressurized condition within said assembly.

18. A filter box assembly for integrating into a bi-directional vent and air intake line associated with a vehicle fuel tank, said assembly comprising:

an outer shell having an open inserting end and opposite closed end;

a check valve integrated into said closed end of said outer shell, said check valve further including a covering cap, a cylindrical stem projecting from an underside of said cap which is channeled between an annular support surface formed into said closed end of said shell; and an inner component engageable within said open inserting end of said outer shell and collectively defining a plurality of continuous and reverse flow passageways extending between a plurality of inlet apertures formed in a base surface of said inner component and a conduit attachment nipple extending from said inner component.

19. The filter box assembly as described in claim 18, further comprising a bottom of said stem exhibiting an outer angled end detent, a compression spring seated between an upper seating edge of said end detent and an annular underside profile associated with said closed end of said outer shell.

* * * * *